US005666631A

United States Patent [19]
Polizzotti et al.

[11] Patent Number: 5,666,631
[45] Date of Patent: Sep. 9, 1997

[54] METAL ARTICLE AND METHOD FOR PRODUCING THE SAME

[75] Inventors: Richard S. Polizzotti, Milford; Larry E. McCandlish, Highland Park, both of N.J.; Edwin L. Kugler, Morgantown, W. Va.

[73] Assignee: Exxon Research & Engineering Company, Florham Park, N.J.

[21] Appl. No.: 560,126

[22] Filed: Nov. 17, 1995

Related U.S. Application Data

[62] Division of Ser. No. 405,631, Mar. 17, 1995, Pat. No. 5,490,968, which is a division of Ser. No. 128,182, Sep. 29, 1993, Pat. No. 5,441,553, which is a continuation-in-part of Ser. No. 735,212, Jul. 24, 1991, Pat. No. 5,338,330, which is a continuation-in-part of Ser. No. 377,653, Jul. 10, 1989, abandoned, which is a continuation-in-part of Ser. No. 53,267, May 22, 1987, Pat. No. 4,851,041.

[51] Int. Cl.$^6$ ............................................. B22F 1/02
[52] U.S. Cl. ........................... 419/2; 419/11; 419/14; 419/18; 419/36; 419/37; 419/45; 419/47; 419/53; 419/54; 419/55; 419/31; 419/10; 419/13; 419/23
[58] Field of Search ........................ 419/2, 11, 14, 419/18, 36, 37, 45, 47, 53, 54, 55, 31, 10, 13, 23; 75/230, 240, 236, 243, 244, 228, 252, 345, 247, 255, 953

[56] References Cited

U.S. PATENT DOCUMENTS

| | | | |
|---|---|---|---|
| 4,851,041 | 7/1989 | Polizotti et al. | 75/240 |
| 5,338,330 | 8/1994 | Polizotti et al. | 75/228 |
| 5,441,553 | 8/1995 | Polizotti et al. | 75/230 |
| 5,490,968 | 2/1996 | Polizotti et al. | 419/2 |

*Primary Examiner*—Charles T. Jordan
*Assistant Examiner*—Daniel Jenkins
*Attorney, Agent, or Firm*—Joseph J. Dvorak; Jay Simon

[57] ABSTRACT

A compacted, single phase or multiphase composite article. Particles for use in the compacted article are produced by providing a precursor compound containing at least one or at least two metals and a coordinating ligand. The compound is heated to remove the coordinating ligand therefrom and increase the surface area thereof. It may then be reacted so that at least one metal forms a metal-containing compound. The particles may be consolidated to form a compacted article, and for this purpose may be used in combination with graphite or diamonds. The metal-containing compound may be a nonmetallic compound including carbides, nitrides and carbonitrides of a refractory metal, such as tungsten. The metal-containing compound may be dispersed in a metal matrix, such as iron, nickel or cobalt. The dispersed nonmetallic compound particles are no larger than about 0.1 micron in particle size and have a volume fraction greater than about 0.15 within the metal matrix.

10 Claims, 5 Drawing Sheets

METAL ARTICLE AND METHOD FOR PRODUCING THE SAME

CROSS REFERENCE TO RELATED APPLICATIONS

This application is a Rule 60 divisional of application Ser. No. 405,631 filed Mar. 17, 1995 now U.S. Pat. No. 5,490,968, which is a Rule 60 divisional of Ser. No. 128,182 filed Sep. 29, 1993, now U.S. Pat. No. 5,441,553, which is a CIP of Ser. No. 735,212 filed Jul. 24, 1991, now U.S. Pat. No. 5,338,330, which is a CIP of Ser. No. 377,653 filed Jul. 10, 1989 (abandoned), which is a CIP of Ser. No. 053,267, filed May 22, 1987, which issued as U.S. Pat. No. 4,851,041 (now dedicated).

BACKGROUND OF THE INVENTION

1. Field of the Invention

This invention relates to a single phase article and to a multiphase composite and to a method for producing the same.

2. Description of the Prior Art

Composite products having multiphases of matrix metal and a hardening phase are used in various applications requiring hard, wear-resistant properties. The composites comprise a metal matrix, which may be for example, iron, nickel, or cobalt, with a hard-phase nonmetallic dispersion therein of, for example, carbides, nitrides, oxynitrides or industrial diamonds.

Tungsten carbide-cobalt composites are one significant example of composites of this type and the production thereof typifies the conventional practices used for the manufacture of these composites.

The manufacturing process consists of synthesis of the pure carbide and metal powders, blending of the carbide and metal powders to form a composite powder, consolidation of the composite powder to produce a "green" compact of intermediate density and, finally, liquid phase sintering of the compact to achieve substantially full density.

Preparation of the tungsten carbide powder conventionally comprises heating a metallic tungsten powder with a source of carbon, such as carbon black, in a vacuum at temperatures on the order of 1350° C. to 1600° C. The resulting coarse tungsten carbide product is crushed and milled to the desired particle size distribution, as by conventional ball milling, high energy vibratory milling or attritor milling. The tungsten carbide powders so produced are then mixed with coarse cobalt powder typically within the size range of 40 to 50 microns. The cobalt powders are obtained for example by the hydrogen reduction of cobalt oxide at temperatures of about 800° C. Ball milling is employed to obtain an intimate mixing of the powders and a thorough coating of the tungsten carbide particles with cobalt prior to initial consolidation to form an intermediate density compact.

Begg et al, U.S. Pat. No. 4,749,545, relates to milling metal composites that contain at least 40% v/v of hard material and states that prior art mixing techniques fail to incorporate as high a proportion of hard material into the composite. However, in Begg the hard-phase particle sizes are in excess of 0.1 micron. Mechanical milling, as used in Begg to reduce the particle sizes of the hard phase, typically produces particles with diameters in excess of 0.1 micron.

Milling of the tungsten carbide-cobalt powder mixtures is usually performed in carbide-lined mils using tungsten carbide balls in an organic liquid to limit oxidation and minimize contamination of the mixture during the milling process. Organic lubricants, such as paraffins, are added to powder mixtures incident to milling to facilitate physical consolidation of the resulting composite powder mixtures. Prior to consolidation, the volatile organic liquid is removed from the powders by evaporation in for example hot flowing nitrogen gas and the resulting lubricated powders are cold compacted to form the intermediate density compact for subsequent sintering or mechanical compaction.

Prior to high-temperature, liquid-phase sintering, the compact is subjected to a presintering treatment to eliminate the lubricant and provide sufficient "green strength" so that the intermediate product may be machined to the desired final shape. Presintering is usually performed in flowing hydrogen gas to aid in the reduction of any residual surface oxides and promote metal-to-carbide wetting. Final high temperature sintering is typically performed in a vacuum at temperatures above about 1320° C. for up to 150 hours with the compact being imbedded in graphite powder or stacked in graphite lined vacuum furnaces during this heating operation. In applications where optimum fracture toughness is required, hot isostatic pressing at temperatures close to the liquid phase sintering temperature is employed followed by liquid phase sintering to eliminate any residual microporosity.

As can be seen, with conventional practices, problems are encountered both in the synthesis and the blending of the powders. Specifically, kinetic limitations in the synthesis of the components require processing at high temperature for long periods of time. In additions, control of carbon content is difficult. Likewise, compositional control is impaired by the introduction of impurities during the mechanical processing of the composite powders and primarily during the required milling operation. Likewise, the long time necessary for achieving microstructural control and homogenization during milling ads significantly to the overall processing costs. Also, microstructural control from the standpoint of achieving desired hard-phase distributions is difficult.

Specifically, in various applications extremely fine particle dispersions of the hardening phase within a metal matrix is desired to enhance the combination of hardness, wear resistance and toughness.

Typically, particle reinforced materials are divided into two categories: dispersion strengthened and subparticle strengthened materials. Materials in these categories have the following properties:

| Property | Strengthened | Strengthened |
| --- | --- | --- |
| subparticle diameter | <1 micron | >1 micron |
| matrix mean free path | 0.01 to 0.3 micron | >1 micron |
| volume fraction of dispersoid | <0.15 | >0.25 |

P. A. Thorton and V. J. Calangelo, *Fundamentals of Engineering Materials*, Prentice-Hall, Englewood Cliffs, N.J. (1985) p. 593.

Preferably, the reinforcement is carried out with materials such as oxides of relatively low solubility within the metal matrix. In dispersion strengthened materials, the presence of foreign particles within the metallic structure inhibits the migration of dislocations within the matrix responsible for creep. However, in each case it is necessary to determine the optimum particle spacing and particle size for the given metal matrix before the particles can impart additional strength to the metal. These optimums vary from metal to metal. As a result, there is little ability to control the microstructure and homogeneity of the resultant metal powder during milling.

Moreover, the high surface area of the dispersed hard phase is generally unstable. Diffusive coarsening of the particle dispersion degrades the materials performance. Therefore, low solubility is necessary in order to kinetically limit thermal diffusive coarsening of the reinforcing dispersion.

SUMMARY OF THE INVENTION

The invention relates to a new class of particulate reinforced materials, herein referred to as nano phase composites. Nano phase composites have a nonmetallic subparticle diameter of less than 0.1 micron and a subparticle nonmetallic volume fraction greater than 0.15.

It is accordingly a primary object of the present invention to provide a single phase article or multiphase composite and method for producing the same wherein conventional mechanical processing to achieve the presence of the required phase structure is substantially eliminated.

A more specific object of the invention is a method for producing a single phase article or multiphase composite wherein both the chemical composition and the microstructure thereof may be readily and accurately controlled.

Additional objects and advantages of the present invention will be set forth in part in the description that follows and in part will be obvious from the description or may be learned by practice of the invention. The objects and advantages of the invention may be realized and obtained by the method particularly pointed out in the appended claims.

In accordance with the invention, and specifically the method thereof, a single phase article or multiphase composite is produced by providing a precursor compound, preferably which may be in a coordination compound or an organometallic compound, containing at least one or at least two metals and a coordinating ligand. The compound is heated to remove the coordinating ligand therefrom and increase the surface area thereof. Thereafter at least one of the metals may be reacted to form a metal containing compound. For this purpose, the coordination compound is preferably in the form of a particle charge. The metal-containing compound may be a fine dispersion within the metal matrix, and the dispersion may be a nonmetallic phase. During reaction, at least one of the metals may be reacted with a solid phase reactant which may be, for example, carbon- or nitrogen- or a diamond-containing material. The carbon-containing material may be graphite. Alternately, the reaction of the metal may be a gas to form the metal-containing compound, which may be a refractory metal compound. Preferably, the refractory metal compound is a carbide, a nitride or carbonitride, singly or in combination. Likewise, preferably the metal matrix is cobalt, nickel or iron. The most preferred matrix material however is cobalt with tungsten carbide being a preferred refractory metal compound. Where the reaction is with a gas, the gas preferably contains carbon and for this purpose may be carbon monoxide-carbon dioxide gas mixture.

The article in accordance with the invention is a single phase or multiphase composite particle which is used for form a particle charge. The particle charge may be adapted for compacting or consolidating to form the desired compacted article or compact which may be multiphase composite article. The particles constituting the particle charge for this purpose in accordance with the invention may comprise a metal matrix having therein a substantially uniform and homogeneous hard phase distribution of particles of a nonmetallic compound, which may be carbides, nitrides, or carbonitrides and preferably tungsten carbide. As mentioned previously, the nonmetallic compound particles are preferably of submicron size, being no larger than 0.1 micron. The compacted article may include diamond particles or graphite. The metal matrix may be cobalt, iron or nickel. The nonmetallic compound may be carbides, nitrides or carbonitrides, such as tungsten carbide.

The accompanying drawings, which are incorporated in and constitute a part of this specification, illustrate embodiments of the invention and, together with the description, serve to explain the principles and advantages of the invention.

DETAILED DESCRIPTION OF THE PREPARED EMBODIMENTS

Reference will now be made in detail to presently preferred embodiments of the invention, examples of which are described below and illustrated in the accompanying drawings. In the examples and throughout the specification and claims, all parts and percentages are by weight unless otherwise specified.

The method of the invention embodies the steps of reduction decomposition of a suitable mixed metal coordination compound or mixed metal organometallic precursor at a temperature sufficient to yield an atomically mixed high surface area reactive intermediate product, followed by carburization reduction of the reactive intermediate in flowing $CO/CO_2$ gas wherein the carbon and oxygen activity are thermodynamically well defined and controlled to yield the desired pure component or metal/metal carbide composite powder. With this practice, intimate mixing of the components of the composite powder product is assured, because the chemical constituents are atomically interdispersed in the initial coordination or precursor compound. Kinetic limitations in the conversion of the precursor and reactive intermediates are avoided due to the high surface area of the powder product intermediates allowing processing at lower temperatures and for shorter times and providing a greater range of microstructural control. Purity of the product and control of phase composition is assured by precise thermodynamic control of the conditions of transformation of the reactive intermediate. The metallic composition (e.g., W/Co atomic ratio) of the product is fixed at the initial metallic composition of the precursor compound of precursor compound mixture.

It is important to note that although the practice of the invention will be demonstrated for the production of mixed metal carbide and metal/carbide composite systems, the invention is equally applicable to the fabrication of a wide range of system including sulfides, nitrides, oxides and any other thermodynamically stable mixture of mixed metal and non-metal components.

The processing concept of the invention has been demonstrated for the specific example of the production of pure mixed metal carbide powders and metal/metal carbide composite powders in the ternary Co—W—C system from the precursor transition metal coordination compound Co(en)$_3$WO$_4$ (en=ethylenediamine).

Figure 1:
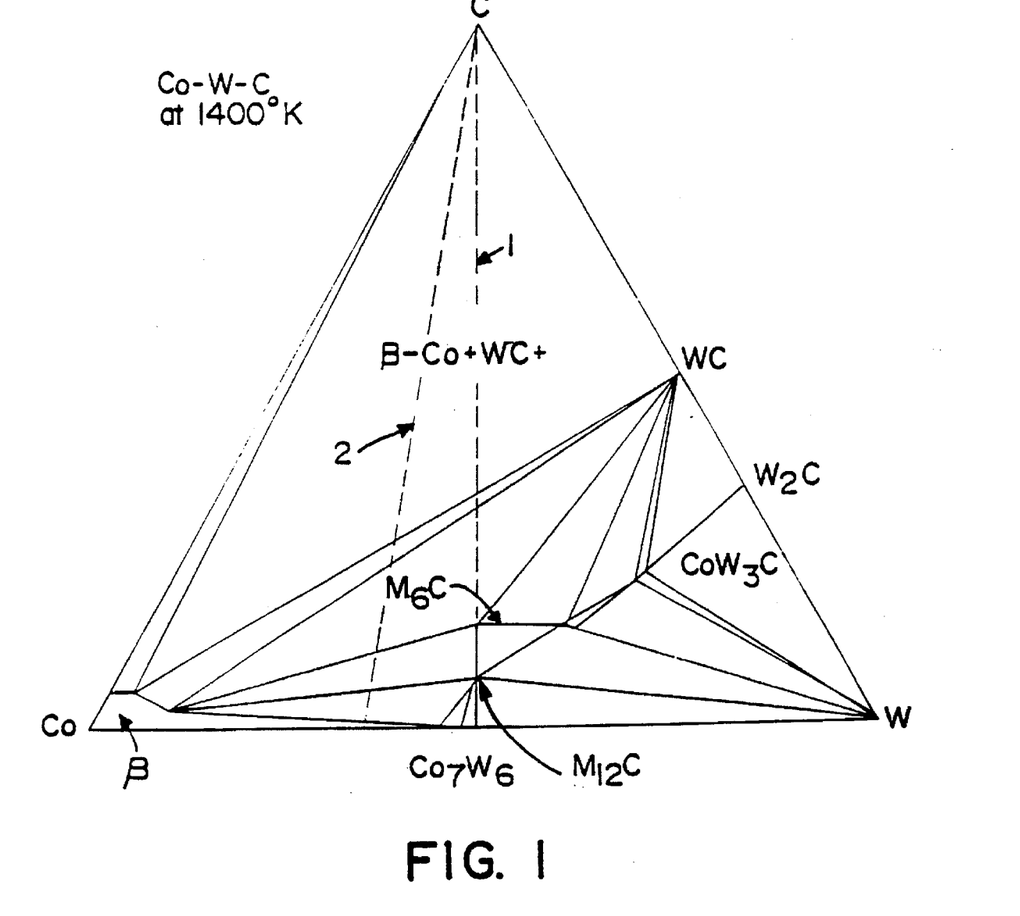
FIG. 1 is a cobalt-tungsten-carbon isothermal section of a ternary phase diagram at 1400° C.
Figure 2:
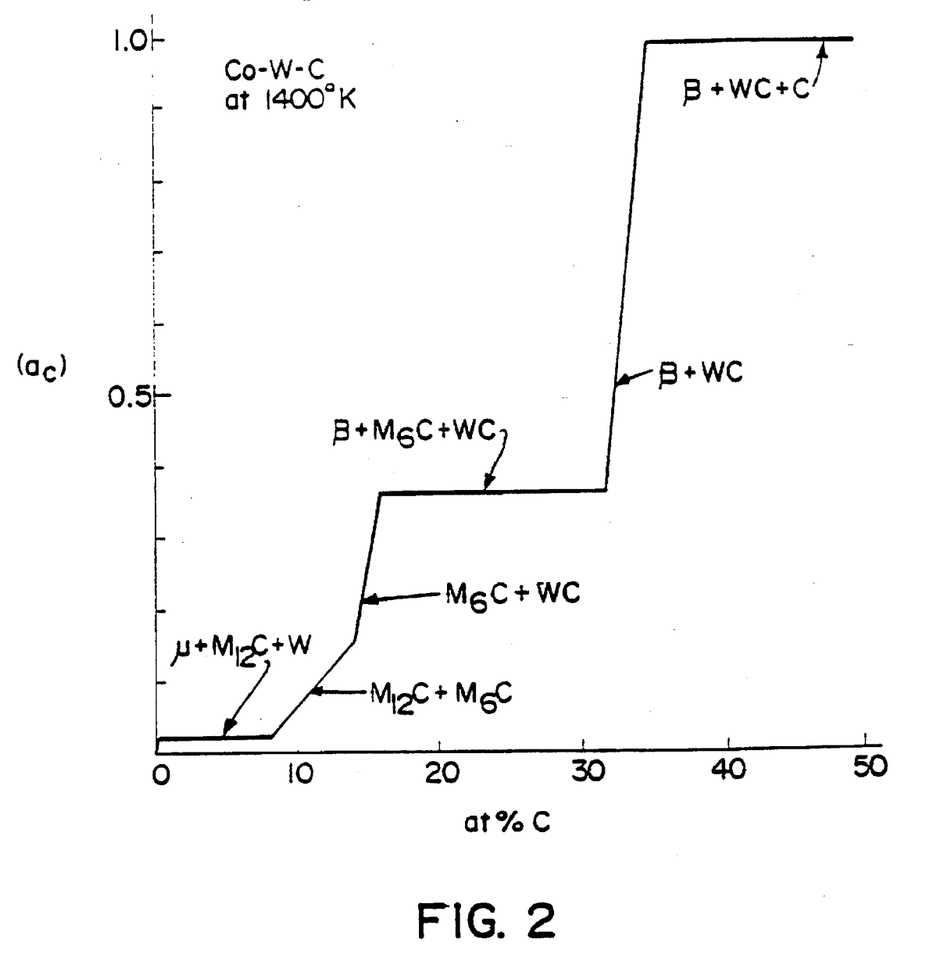
FIG. 2 is a schematic diagram of the carbon activity ($a_c$) variation along tieline 2 indicated in FIG. 1.

FIG. 1 illustrates an isothermal section at 1400° K. through the Co—W—C ternary phase diagram. Since the Co(en)$_3$WO$_4$ precursor fixes the W/Co atomic ratio at 1/1, the phases accessible by using this pure precursor lie along tieline 1 from the carbon vertex to the 50 at % point on the Co/W binary composition line as illustrated. With movement along the tieline away from the pure 1/1 W/Co binary alloy, the carbon concentration of the ternary system increases linearly with distance above the Co/W binary composition line but the carbon activity of the system varies in accordance with the requirements of the phase rule and the activity coefficients in the single, two and three phase regions. With traverse of the tieline, several single, two and three phase regions are traversed and the carbon activity changes in a stepwise fashion as illustrated schematically in FIG. 2 (see tieline 2 in FIG. 1). Thermodynamically equilibrating a precursor with 1/1 ratio of cobalt to tungsten at 1400° K. and at the carbon activity corresponding to the pure single phase Co$_6$W$_6$C eta carbide fixes the composition of the end product and would be expected to produce the pure eta carbide phase. Similarly, fixing the carbon activity in the two phase region consisting of WC and β-Co/W/C solid solution at 1400° K. and bringing the same precursor to thermodynamic equilibrium, would result in a two-phase mixture of hexagonal WC and a β-Co/W/C solid solution with the composition determined by the tieline passing through the pure WC composition on the W/C binary axis and the point corresponding to the experimentally chosen carbon activity at which equilibrium is established on the 1/1 W/Co composition tieline 1, as illustrated in FIG. 1. The chemical form of the initial precursor is not significant provided that kinetic limitations in reaching equilibrium do not hinder the thermodynamic conversion to final products. Reductive decomposition of the Co(en)$_3$WO$_4$ at low temperature changes the chemical state of the metallic species but more importantly, results in a highly dispersed reactive precursor which can be quickly equilibrated to the final product at temperatures, for example, above 700° C.

Figure 3A:
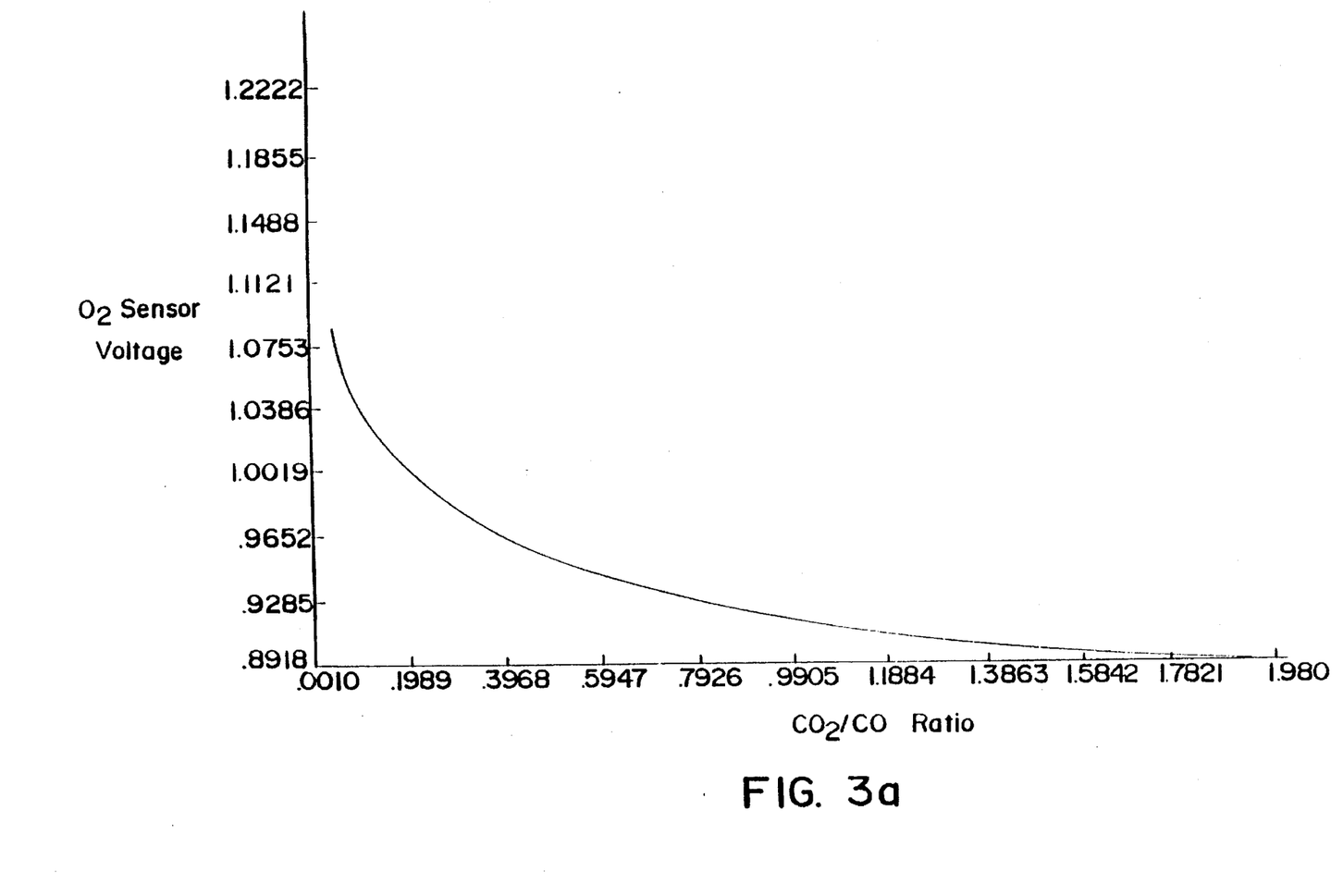
FIGS. 3a and 3b are plots of variation of oxygen sensor voltage with $CO_2/CO$ ratio at a total pressure of 900 Torr. and 850° C. process temperature; and variation of the carbon activity with $CO_2/CO$ ratio at 900 Torr. total pressure and 850° C. reaction temperature, respectively.
Figure 3B:
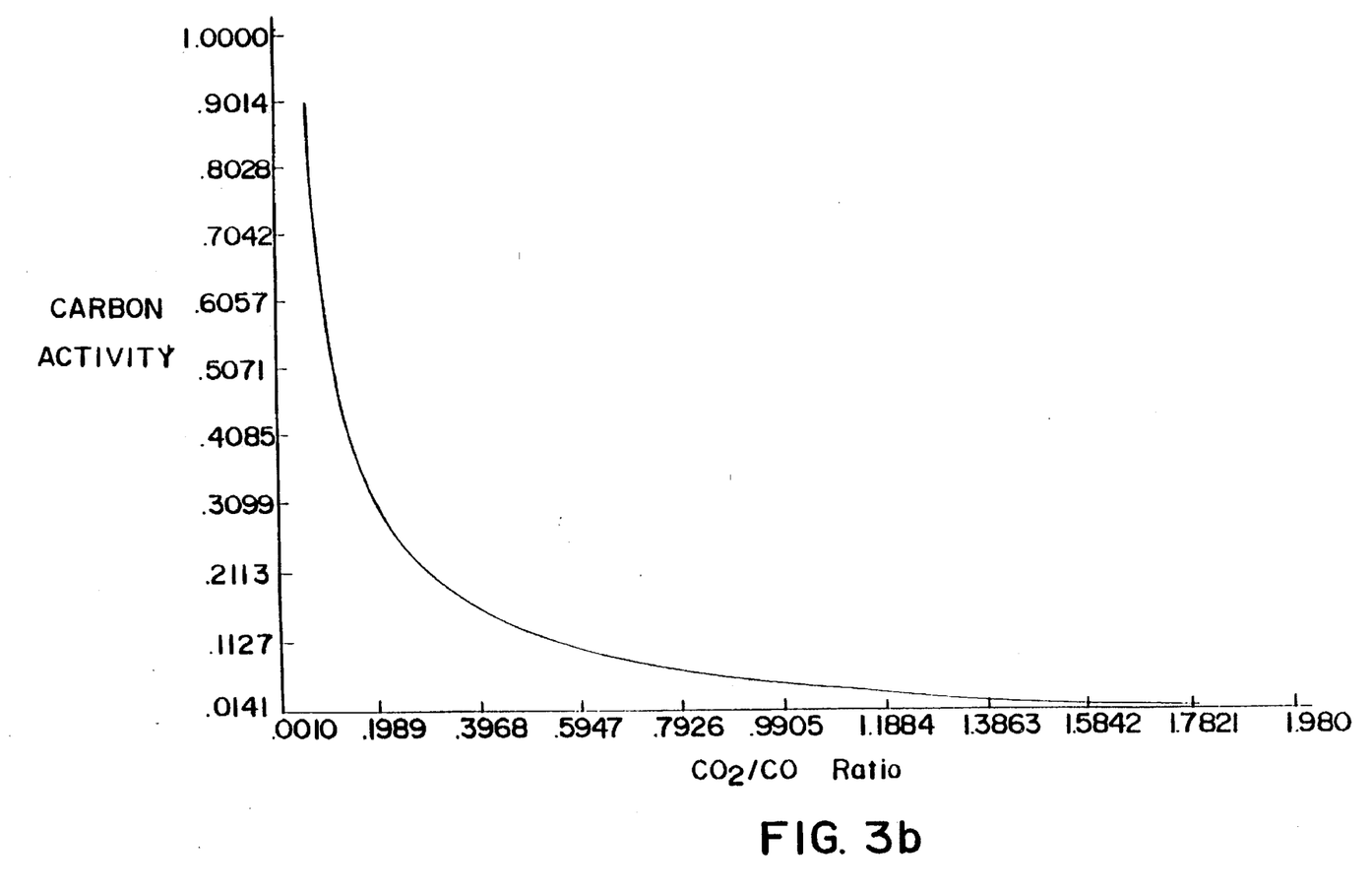
Figure 4:
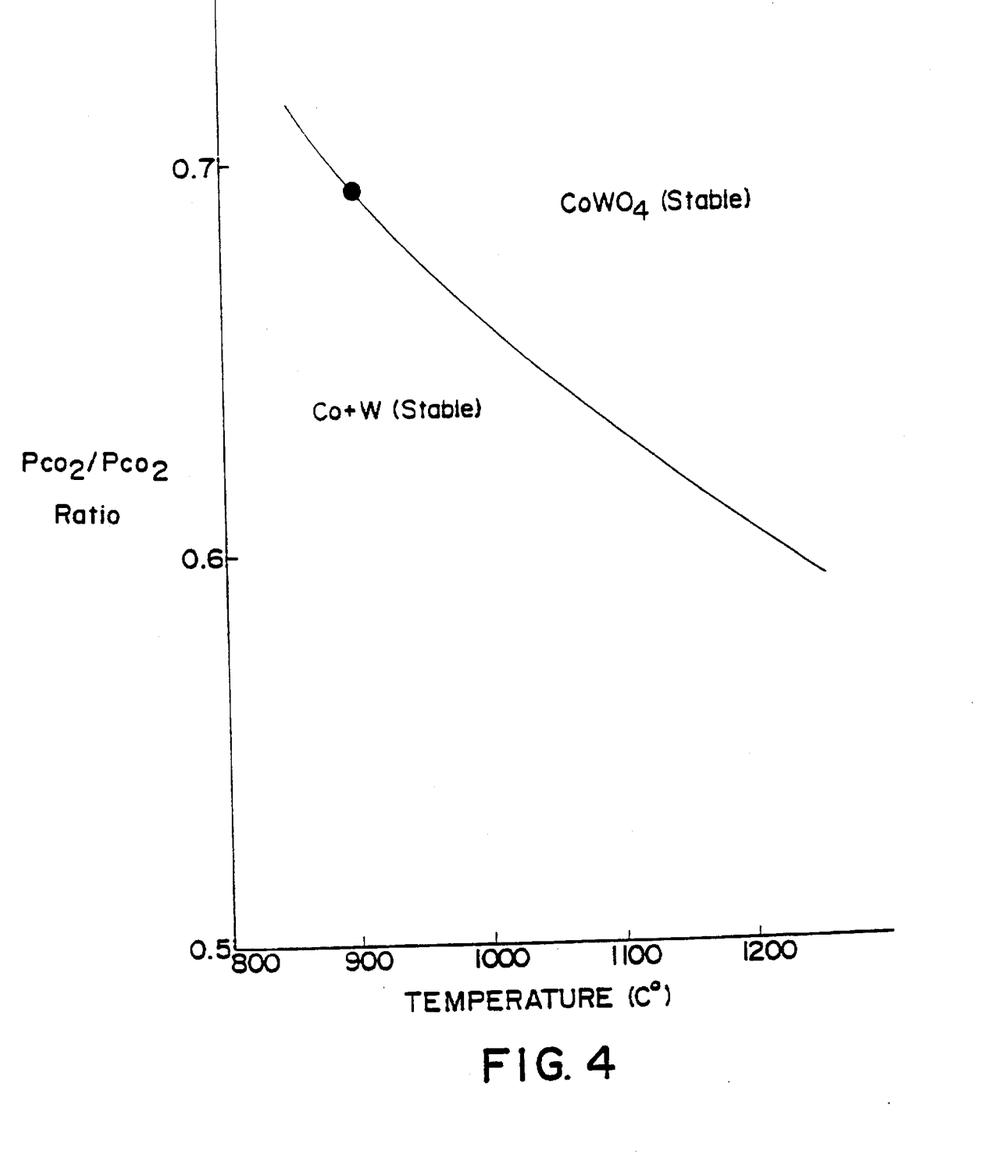
FIG. 4 is a plot demonstrating temperature dependence of the $CO_2/CO$ ratio below which $CoWO_4$ is thermodynamically unstable at 760 Torr. total pressure.

For equilibration at constant carbon activity, the following reaction may be employed:

$$2\ CO(g) + CO_2(g) + C(s) \tag{I}$$

where the CO and CO$_2$ are gas phase species and C(s) is the solid carbon phase available for reaction to form the desired carbide phase, dissolved carbon or free carbon. From equation (I) the equilibrium carbon activity (a$_c$) of a CO/CO$_2$ gas mixture is $$a_c = \frac{P^2_{CO}}{P_{CO_2}} \exp(-\Delta G°_I/RT) \tag{II}$$

where $\Delta G_I$ is the standard free energy of formation of 1 mole of carbon in reaction I above at the, reaction temperature T and R is the molar gas constant. For a fixed total reactive gas pressure and ratio of Pco$_2$/P$_{co}$ the equilibrium carbon activity of the gas environment is fixed by equation (II). Two issues are considered in fixing the carbon activity with CO/CO$_2$ gas mixtures for the method of the invention: control of carbon activity should be easy and accurate and the equilibrium oxygen activity of the CO/CO$_2$ mixture used should be below that for which any oxide phase is stable at the reaction temperature. The equilibrium oxygen activity of a CO/CO$_2$ gas mixture can be calculated from the reaction:

$$2CO_2 + 2CO + O_2 \tag{III}$$

for which the oxygen partial pressure (P$_{o2}$) is given by where $\Delta G_{III}$ is the standard free energy of formation of one mole of O$_2$ in equation (III) at the reaction temperature T. Equations (IV) and (II) show that the oxygen partial pressure and carbon activity at constant total reactive gas pressure (P$_t$=Pco$_2$) and temperature are coupled. At constant T and Pt, measurement of the oxygen partial pressure of the gas phase therefore is a unique determination of the carbon activity of the gas phase. This observation provides a simple and precise method for determination and control and the carbon activity. The oxygen partial pressure of the gas phase may for example be continuously measure by means of a 7½% calcia stabilized zirconia oxygen probe located ideally in the hot zone of the furnace in which the thermodynamic conversion of the reactive precursor is carried out. The carbon activity of the gas phase is then calculated by equation (II) from a knowledge of the total reaction pressure, temperature and Pco/Pco$_2$ as determined by equation (IV). FIGS. 3a and 3b illustrate the relationship between oxygen sensor voltage, carbon activity and Pco$_2$/Pco ratio for typical reaction conditions used in the synthesis of mixed metal/metal carbide composites in the CO/W/C ternary system. Generally, the coupling of equations I and III requires that the total pressure in the system be adjusted so that no undesirable oxide phase is stable at conditions required to form the desired carbide phase. At temperatures above 800° C. no carbides of cobalt are thermodynamically stable at atmospheric pressure. The upper limit on the CO$_2$/CO ratio which can be used is determined by the requirement that no oxide of cobalt or tungsten be stable under the processing conditions. FIG. 4 shows the locus of CO$_2$/CO ratios (at 1 atm. total reactive gas pressure) as a function of temperature below which the most stable oxide, CoWO$_4$, is unstable. In achieving equilibrium with the reactive gas the high surface area of the reactive intermediate is significant to facilitate rapid conversion to the final product at the lowest possible temperatures. This applies equally to reaction between the reactive intermediate and solid reactants.

EXAMPLE I

The reactive precursor for the synthesis of a pure Co$_6$W$_6$C eta phase and β-Co/W/C solid solution/WC composite powders was prepared by reductive decomposition of Co(en)$_3$WO$_4$. The transition metal coordination compound was placed in a quartz boat in a 1.5" I.D. quartz tubular furnace and heated in a flowing mixture of equal parts by volume of He and H$_2$ at 1 atm. pressure and total flow rate of 160 cc/min. The furnace was ramped from room temperature to a temperature of 650° C. at a heating rate of 5° C./min., held for three hours and cooled to room temperature the flowing gas. At room temperature, the reactive gas was replaced by He at a flow rate of 40 cc/min. The resulting reactive precursor was subsequently passivated in He/O$_2$ gas mixtures by successive addition of O$_2$ with increasing concentration prior to removal from the furnace tube. X-ray diffraction of the resulting powders showed the presence of crystalline phases of CoWO$_4$ and WO$_2$ in addition to minor concentrations of other crystalline and possibly amorphous components of an unidentified structure and composition.

The reactive high surface are precursor produced by the low temperature reductive decomposition of $CO(en)_3WO_4$ described above was placed in a quartz boat at the center of the uniform hot zone of a quartz tubular furnace in flowing Ar at 900 Torr. pressure and 250cc/min. flow rate. The furnace temperature was raised rapidly to the conversion temperature (typically 700° C. to 1000° C.). The Ar flow was quickly replaced by the $CO_2/CO$ mixture with total pressure and $CO_2/CO$ ratio necessary to achieve the desired carbon and oxygen activities at the conversion temperature. The sample was held isothermal in the flowing reactive gas at a flow rate of 500 cc/min. for a time sufficient to allow complete equilibration of the carbon activity of the precursor with the flowing gas. The $CO_2/CO$ gas mixture was then purged from the reaction tube by Ar at a flow rate of 500 cc/min. and the furnace was rapidly cooled to room temperature. Samples were removed at room temperature without passivation.

It was determined that complete conversion to the pure $Co_6W_6C$ eta carbide had occurred for the precursor processed at $a_c=0.1$ while complete conversion to a two phase mixture of $\beta$-Co/W/C solid solution and hexagonal WC had occurred from the same precursor processed at $a_c=053$.

Microscopic examination of product powders indicated the pure eta phase carbide powder to consist of a highly porous sponge-like network of interconnected micron sized carbide grains exhibiting little or no crystallographic faceting and significant necking and bridging between individual carbide grains to form large carbide aggregates. A similar structure was observed for the two phase $\beta$-Co/W/C solid solution-WC composite powder. This structure, however, is composed of an intimate mixture of the two phases with substantial wetting of the WC grains by the cobalt-rich solid solution phase. The average particle size of the product powder is a strong function of the temperature at which the thermodynamic equilibration is carried out. The volume fraction of the tungsten-carbide phase was constant at 0.66, fixed by the ratio of cobalt:tungsten in the precursor compound.

EXAMPLE II

Tris(ethylenediamine cobalt) tungstate, $Co(en)_3WO_4$, was blended with cobaltous oxalate, $CoC_2O_4$ and the mixture ground in a mortar before it was subjected to pyrolytic reduction to produce a reactive intermediate. Similarly, the variation of the W/Co ratio could also be achieved by blending tris(ethylenediamine cobalt) tungstate $Co(en)_3WO_4$ with tungstic acid and mixture ground in a mortar before it was subjected to pyrolytic reduction to produce a reactive intermediate or alternative chemical precursors, e.g., $[Co(en)_3]_2(WO_4)_3$ can be employed. In the case of the reactive intermediate obtained by blending with cobaltous oxalate, the reactive intermediate was treated with $CO_2/CO$ to produce the equilibrium product at a carbon activity of 0.078. The method described in Example I was used to accomplish the reduction and carburization. X-ray analysis showed the product to be a mixture of $Co_6W_6C$ eta phase and Co metal. This product was pressed in a vacuum die (250 psi on a 4 inch ram) to produce a (13 mm diameter×5 mm) cylindrical pellet. Particular are was taken not to expose the powder to air during the pelletizing procedure. The die walls were also lubricated with stearic acid so that the pellet could be removed from the die without damage. Next, the pellet was transferred to a vacuum induction furnace where it was placed in a graphite crucible. The crucible also acted as a susceptor for the furnace. The sample chamber was immediately placed under a vacuum. When the system pressure stabilized at $10^{-8}$ Torr. the sample temperature was increased slowly to 700° C. In order to allow for sample outgassing, then the temperature was quickly ramped to 1350° C. to allow for liquid phase sintering. The furnace was turned off immediately and the sample allowed to radiatively cool. The sample pellet was found to have reacted with the graphite crucible, becoming strongly attached to the crucible in the process. Examination indicated that the $Co_6W_6C$ reacted with the carbon to produce WC and Co at the interface and in the process brazed the pellet to the graphite surface.

EXAMPLE III

In a similar experiment $Co_6W_6C$ was mixed with diamond powder. This mixture was pressed into a pellet and reactively sintered in the vacuum induction furnace. The result was an article in which diamond particles were brazed in a matrix of Co/W/C.

EXAMPLE IV

The reactive precursor for the synthesis of a nanoscale $\beta$-Co/W/C solidsolution/WC composite powder was prepared by reductive decomposition of $CO(en)_3WO_4$. The transition metal coordination compound was placed in an alumina boat in a 1.5" I. D. quartz tubular furnace and heated in a flowing mixture of equal parts by volume of Ar and $H_2$ at 900 Torr. pressure and total flow rate of 200 co/min. The furnace was ramped from room temperature to a temperature of 700° C. at a heating rate of $\geq 35°$ C./min. The sample was cooled rapidly to room temperature and the reactive gas was replaced by Ar at a flow rate of 300 cc/min. at a pressure of 900 Torr. The temperature was then rapidly ramped to 700° C. and 5 cc/min. $CO_2$ added to the argon. The reactive precursor was thereby lightly oxidized for several minutes and cooled to room temperature to facilitate the subsequent conversion. X-ray diffraction of the reactive intermediate resulting from the thermal decomposition described above showed it to consist of a mixture of high surface area metallic phases. Following light surface oxidation, the furnace temperature was raised rapidly to the conversion temperature of 750° C. The $Ar/CO_2$ flow was replaced by the $CO_2/CO$ mixture with total pressure and $CO_2/CO$ ratio necessary to achieve the desired carbon and oxygen activities at the conversion temperature. The sample was held isothermal in the flowing reactive gas at a flow rate of 300 cc/min. for a time sufficient to allow complete equilibration of the carbon activity of the precursor with the flowing gas, typically less than three hours. The $CO_2/CO$ gas mixture was then purged from the reaction tube by Ar at a flow rate of 300 cc/min. and the furnace was rapidly cooled to room temperature. Samples were removed at room temperature without passivation.

It was determined that complete conversion to a two phase mixture of $\beta$-Co/W/C solid solution and hexagonal WC had occurred at a carbon activity $a_c=0.95$.

A microscopic examination of the product powders shows them to consist of WC grains with typical grain diameters of 100A–200A in a matrix of $\beta$-Co/W/C solid solution. This structure is composed of an intimate mixture of two phases with substantial wetting of the WC grains by the cobalt-rich solid solution phase in which the tungsten-carbide (WC) volume fraction is 0.66 (77 w/o WC).

The particles in accordance with the invention are suitable for sintering to composite hard metal articles. In the high temperature consolidation of β-Co/W/C solid solution-WC composite powders to hard metal compacts, the growth of the WC grains is a slow process controlled by interfacial dissolution of the W and C at the β-Co solid solution WC interface, and the microstructure of the resulting compacts strongly reflects the WC particle size distribution of the composite powder from which the compact is sintered. The temperature and time of the thermodynamic equilibration step is an effective means of controlling the carbide microstructure eliminating the necessity for mechanical processing to achieve the desired WC grain size distribution and wetting of the WC phase by the cobalt rich solid solution phase. The potential for introduction of property degrading impurities in these composite powders is likewise reduced by elimination of the mechanical processing route.

The microstructure of the compacted article made from the particles in accordance with the invention may be controlled by passivating the reactive precursor prior to the carburization step. If the reactive precursor is passivated by heavy oxidation, complete carburization requires longer times on the order of 200 or more hours at 800° C. This results in an article with a larger carbide size of for example 0.5 micron. Carbide size is a function of time at temperature with higher temperatures and longer heating times resulting in carbide growth and increased carbide size. Therefore, if the precursor is not passivated or lightly passivated, complete carburization may occur in about nine hours at 800° C. to result in a product with an average carbide size of 0.1 micron. Further, if the reactive precursor is passivated by the controlled oxidation of its surface, carburization at 800° C. may be completed within three hours to result in a drastic reduction in the carbide size from the microscale to the nanoscale.

With the invention, it may be seen that precise control of composition, phase purity, hard phase volume fraction and microstructure of the powder particles may be achieved by selection of the metallic composition of the precursor compound and by precise thermodynamic control of the conversion from precursor to final product. The advantageous intermixing and wetting of the component phases is assured by the growth of these phases from a homogeneous precursor in which the chemical constituents of the final composite phases are initially atomically intermixed. Accordingly, the invention substantially eliminates the prior art need for mechanical processing to achieve multiphase composite powders and thus greatly reduces the presence of property-degrading impurities in the final, compacted products made from these powder particles.

What is claimed is:

1. A method for producing an article having a metal-containing phase, said method comprising providing a precursor compound containing at least one metal and a coordinating ligand, heating said compound to remove said coordinating ligand therefrom and increase the surface area thereof, and thereafter reacting at least one of said metals to form a metal-containing compound.

2. The method of claim 1 wherein said precursor compound is in the form of a particle charge.

3. The method of claim 1 or claim 2 wherein said metal-containing compound is a nonmetallic compound.

4. The method of claim 3 wherein said nonmetallic compound is a refractory-metal compound.

5. The method of claim 4 wherein at least one of said metals is reacted with a solid phase reactant.

6. The method of claim 4 wherein said refractory metal compound is a carbide.

7. The method of claim 6 wherein said carbide is tungsten carbide.

8. A method for producing a multiphase composite, said method comprising providing a precursor compound containing at least two metals and a coordinating ligand and heating said compound to remove said coordinating ligand therefrom and increase the surface area thereof.

9. The method of claim 8 wherein said precursor compound is in the form of a particle charge.

10. The method of claim 8 or claim 9 wherein said metals are selected from the group consisting of a refractory metal, cobalt, nickel and iron.

* * * * *